US008218907B2

(12) United States Patent
Chen et al.

(10) Patent No.: US 8,218,907 B2
(45) Date of Patent: Jul. 10, 2012

(54) METHOD FOR PRIOR IMAGE CONSTRAINED PROGRESSIVE IMAGE RECONSTRUCTION

(75) Inventors: Guang-Hong Chen, Madison, WI (US); Jie Tang, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 849 days.

(21) Appl. No.: 12/353,864

(22) Filed: Jan. 14, 2009

(65) Prior Publication Data

US 2009/0274355 A1 Nov. 5, 2009

Related U.S. Application Data

(60) Provisional application No. 61/020,847, filed on Jan. 14, 2008, provisional application No. 61/059,891, filed on Jun. 9, 2008.

(51) Int. Cl.
*G06K 9/32* (2006.01)
(52) U.S. Cl. ...................................................... 382/294
(58) Field of Classification Search ............. 250/363.04, 250/363.05; 378/4–27, 901; 382/131, 294; 424/9.4; 359/32; 375/E7.09
See application file for complete search history.

(56) References Cited

U.S. PATENT DOCUMENTS

| 6,841,998 | B1 | 1/2005 | Griswold |
| 7,289,049 | B1 | 10/2007 | Fudge et al. |
| 7,330,027 | B2 | 2/2008 | Kozerke et al. |
| 7,358,730 | B2 | 4/2008 | Mistretta et al. |
| 7,408,347 | B2 | 8/2008 | Mistretta et al. |
| 7,519,412 | B2 | 4/2009 | Mistretta |
| 7,545,901 | B2 | 6/2009 | Mistretta |
| 7,558,414 | B2 | 7/2009 | Griswold |
| 7,647,088 | B2 | 1/2010 | Mistretta et al. |
| 2006/0029279 | A1 | 2/2006 | Donoho |
| 2007/0010731 | A1 | 1/2007 | Mistretta |
| 2007/0038073 | A1 | 2/2007 | Mistretta |
| 2007/0106149 | A1 | 5/2007 | Mistretta |
| 2007/0156044 | A1 | 7/2007 | Mistretta et al. |
| 2007/0167707 | A1 | 7/2007 | Mistretta et al. |
| 2007/0167728 | A1 | 7/2007 | Mistretta et al. |
| 2007/0167729 | A1 | 7/2007 | Mistretta et al. |
| 2008/0199063 | A1 | 8/2008 | O'Halloran et al. |
| 2008/0219535 | A1 | 9/2008 | Mistretta et al. |
| 2009/0076369 | A1 | 3/2009 | Mistretta |
| 2009/0129651 | A1 | 5/2009 | Zagzebski et al. |

OTHER PUBLICATIONS

Michael Lustig, Student Member, IEEE; Compressed Sensing MRI; 18 pages; 2007.*
O'Halloran, et al., "Iterative Projection Reconstruction of Time-Resolved Images Using Highly-Constrained Back Projection (HYPR)", Magn Reson Med, 2008, 59:132-139 (published online Dec. 3, 2007).*
Fessler, et al., "Iterative Image Reconstruction in MRI With Separate Magnitude and Phase Regularization," IEEE International Symposium on Biomedical Imaging: Nano to Macro, 2004; 1:209-212.

(Continued)

*Primary Examiner* — Gregory F Cunningham
(74) *Attorney, Agent, or Firm* — Quarles & Brady LLP (57) ABSTRACT

A method for reconstructing a high quality image from undersampled image data is provided. The image reconstruction method is applicable to a number of different imaging modalities. Specifically, the present invention provides an image reconstruction method that incorporates an appropriate prior image into an iterative image reconstruction process as well as utilizing an image frame from a previous time frame to constrain the reconstruction of a current image frame.

11 Claims, 8 Drawing Sheets

OTHER PUBLICATIONS

Lustig, et al., "Rapid MR Imaging with 'Compressed Sensing' and Randomly Under-Sampled 3DFT Trajectories", Proc. Intl. Soc. Mag. Reson. Med. 14 (2006), p. 695.

Mistretta, et al., "Highly Constrained Backprojection for Time-Resolved MRI", Magn Reson Med, 2006, 55(1):30-40.

Donoho, "Compressed Sensing", Sep. 14, 2004, pp. 1-34.

Schmidt, "Least Squares Optimization with L1-Norm Regularization", Dec. 2005, pp. 1-12.

O'Halloran, et al., "Iterative Projection Reconstruction of Time-Resolved Images Using Highly-Constrained Back-Projection (HYPR)", Magn Reson Med, 2008, 59:132-139 (published online Dec. 3, 2007).

M. Lustig, et al., "Sparse MRI: The application of compressed sensing for rapid MR imaging" Magnetic Resonance in Medicine 58(6):1182-1195 (2007).

Jiayu Song et al; Sparseness Prior Based Iterative Image Reconstruction for Retrospectively Gated Cardiac Micro-CT; Med. Phys. 34(11), Nov. 2007; pp. 4476-4483.

Donoho DL: Compressed Sensing, IEEE Transactions on Information Theory IEEE USA, vol. 52, No. 4, Apr. 2006; pp. 1289-1306.

Emmanuel J Cades et al; Robust Uncertainty Principles: Exact Signal Reconstruction From Highly Incomplete Frequency Information; IEEE Transactions on Information Theory, vol. 22, No. 2, Feb. 2006; 489-509.

* cited by examiner

METHOD FOR PRIOR IMAGE CONSTRAINED PROGRESSIVE IMAGE RECONSTRUCTION

CROSS-REFERENCE TO RELATED APPLICATIONS

This application claims the benefit of U.S. Provisional Patent Application Ser. No. 61/020,847 filed on Jan. 14, 2008, entitled "Method for Image Reconstruction Using Prior Image Constrained Compressed Sensing" and U.S. Provisional Patent Application Ser. No. 61/059,891 filed on Jun. 9, 2008, entitled "Method for Image Reconstruction Using Prior Image Constrained Compressed Sensing".

STATEMENT REGARDING FEDERALLY SPONSORED RESEARCH

This invention was made with United States government support awarded by the following agency: National Institutes of Health, NIH EB005712 and NIH EB007021. The United States government has certain rights in this invention.

BACKGROUND OF THE INVENTION

The field of the invention is medical imaging and particularly, methods for reconstructing images.

In a computed tomography system, an x-ray source projects a cone-shaped beam which is collimated to lie within an x-y plane of a Cartesian coordinate system, termed the "image plane." The x-ray beam passes through the object being imaged, such as a medical patient, and impinges upon an array of radiation detectors. The intensity of the transmitted radiation is dependent upon the attenuation of the x-ray beam by the object and each detector produces a separate electrical signal that is a measurement of the beam attenuation. The attenuation measurements from all the detectors are acquired separately to produce what is called the "transmission profile," or "attenuation profile," or "projection."

The source and detector array in a conventional CT system are rotated on a gantry within the imaging plane and around the object so that the angle at which the x-ray beam intersects the object constantly changes. The transmission profile from the detector array at a given angle is referred to as a "view," and a "scan" of the object comprises a set of views made at different angular orientations during one revolution of the x-ray source and detector. In a 2D scan, data is processed to construct an image that corresponds to a two dimensional slice taken through the object. The prevailing method for reconstructing an image from 2D data is referred to in the art as the filtered backprojection technique. This image reconstruction process converts the attenuation measurements acquired during a scan into integers called "CT numbers" or "Hounsfield units", which are used to control the brightness of a corresponding pixel on a display.

SUMMARY OF THE INVENTION

The present invention provides a method for image reconstruction. More specifically, the present invention provides an image reconstruction method that combines the merits of accurate reconstruction with a gain in signal-to-noise ratio (SNR) by incorporating an appropriate prior image of the subject into the image reconstruction process. In addition to the increased SNR, the method of the present invention provides an increase in temporal resolution. Moreover, for a given desired image and a given number of projections, the method of the present invention provides accurate image reconstruction where previous image reconstruction methods, such as compressed sensing (CS) fail.

One aspect of the present invention provides a method for the reconstruction of quality image frames from time-resolved image data in a real-time fashion. Such a method is applicable to image guided interventional procedures that utilize real-time imaging methods. For example, x-ray fluoroscopy guided interventional procedures are benefited from the method of the present invention in that quality image frames can be reconstructed with a decrease in overall x-ray radiation dose to the patient.

It is another aspect of the invention to provide a method for reconstructing the specific image frame in a time series of image frames utilizing a method that subtracts the current image frame from the nearest neighbor image frame in the time series. For example, the previous image frame is subtracted from the current image frame. In this manner, each newly reconstructed image frame is employed as a dynamic prior image to sparsify the current image frame, which enables accurate reconstruction from much fewer projection data.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Generally speaking, the method of reconstructing an image from a set of data includes a series of numerical steps to estimate a desired image, I, from the measured data samples, Y. More specifically, the image reconstruction should fulfill the following consistency condition:

$$AI = Y \qquad \text{Eqn. (1);}$$

where A is a system matrix. In general, the system matrix, A, can be viewed as a forward projection operator that relates the desired image, I, to the acquired data samples, Y. When dealing with computed tomography (CT) imaging, for example, the system matrix can include a reprojection operation. The consistency condition of equation (1), put in other words, states that when an image is faithfully reconstructed, the forward operation should substantially mimic the actual data acquisition procedure in order to generate a correct estimate of the measured projection data.

Turning now to the image reconstruction method employed when practicing the present invention, a method for reconstructing a quality desired image is provided. In general, a "prior image" is employed to constrain an iterative image reconstruction method, in which the principles of compressed sensing (CS) are utilized. For example, in addition to the sparsifying transforms commonly used in CS, an image is further sparsified by subtracting the prior image from the desired image. As a result, an image can be accurately reconstructed using a substantially fewer number of samples than required by CS methods.

More specifically, given a prior image, $I_p$, and a desired image to be reconstructed, I, the method of the present invention for image reconstruction is implemented by minimizing the following objective function:

$$\alpha\|\Psi_1(I-I_p)\|_1+(1-\alpha)\|\Psi_2 I\|_1 \qquad \text{Eqn. (2)};$$

where $\Psi_1$ and $\Psi_2$ are sparsifying transforms, $\|\ldots\|_1$ is an $L_1$-norm operation, and $\alpha$ is a regularization parameter that is utilized to control the relative weight of the two terms in the objective function of equation (2). As noted above, the following:

$$\|x\|_1 = \sum_{i=1}^{N}|x_i|; \qquad \text{Eqn. (3)}$$

indicates the $L_1$-norm of an N-dimensional vector, x. More generally, a deviation from the true $L_1$-norm is possible while still maintaining adequate image quality in the desired image. For example, the objective function of equation (2) can be generalized as:

$$\alpha\|\Psi_1(I-I_p)\|_p+(1-\alpha)\|\Psi_2 I\|_p \qquad \text{Eqn. (4)};$$

where $\|\ldots\|_p$ is an $L_p$-norm operation having the form:

$$\|x\|_p = \left(\sum_{i=1}^{N}|x_i|^p\right)^{1/p}. \qquad \text{Eqn. (5)}$$

As noted above, preferably p=1.0; however, in the alternative, different values of p are possible. It should be appreciated by those skilled in the art that the further the value of p deviates from p=1.0, generally, the more degradation will be evident in the reconstructed desired image.

The sparsifying transforms in equation (2), $\Psi_1$ and $\Psi_2$, are, in general, different; however, in the alternative, $\Psi_1$ and $\Psi_2$ may be the same sparsifying transform. Exemplary sparsifying transforms include a wavelet transform, a first order finite difference, a second order finite difference, and a discrete gradient transform, such as, for example, a discrete gradient transform, $\nabla_{m,n}$, having the following form:

$$\nabla_{m,n} I(m,n) = \qquad \text{Eqn. (6)}$$
$$\sqrt{[I(m+1,n)-I(m,n)]^2 + [I(m,n+1)-I(m,n)]^2}\,;$$

where the indices m and n indicate the location of a pixel in an image, I. The image specified as $\nabla_{m,n}I(m,n)$ is commonly referred to as the "gradient image".

Both of the terms in the objective function of equation (2) are important. As a result of their importance, the selection of the regularization parameter, $\alpha$, is utilized to control the overall image reconstruction process. Therefore, the selection of the regularization parameter, $\alpha$, will depend on the choice of the prior image, $I_p$, and also the clinical application at hand. For example, the second term in the objective function of equation (2), $(1-\alpha)\|\Psi_2 I\|_1$, mitigates streaking artifacts that are potentially inherited from the prior image, $I_p$. For further example, selecting a regularization parameter of $\alpha \approx 0.3$-$0.7$ is generally sufficient for respiratory imaging applications.

To better incorporate the consistency condition of equation (1) into the overall image reconstruction, the method of Lagrange multipliers is utilized. In such a manner, the consistency condition is employed to add a further constraint on the minimization of the objective function set forth in equation (2). A new objective function is thus produced, which has the form:

$$\alpha\|\Psi_1(I-I_p)\|_1+(1-\alpha)\|\Psi_2 I\|_1+\lambda\|X\|_2^2 \qquad \text{Eqn. (7)};$$

where $\lambda$ is the Lagrange multiplier, X is a difference matrix, and $\|\ldots\|_2^2$ is a squared $L_2$-norm operation, which, for an N-dimensional vector, x, has the form:

$$\|x\|_2^2 = \sum_{i=1}^{N} x_i^2. \qquad \text{Eqn. (8)}$$

The difference matrix in equation (7) accounts for the consistency condition of equation (1), and has the following form:

$$X=AI-Y \qquad \text{Eqn. (9)}.$$

The Lagrange multiplier, $\lambda$, is determined empirically for the particular imaging system employed when practicing the present invention. For example, the Lagrange multiplier, $\lambda$, is determined by a pre-determined tradeoff between the desired data consistency requirement and the similarity to the prior image, $I_p$. When a large Lagrange multiplier, $\lambda$, is selected, the reconstructed image has lower noise variance; however, this may be achieved as a loss of the high spatial resolution characteristic of the prior image. Similarly, when a smaller Lagrange multiplier, $\lambda$, is used, the high spatial resolution characteristic of the prior image is well preserved, but the noise variance can be high in the desired image. Such a situation affects the contrast-to-noise ratio achievable by the imaging system utilized.

The objective function presented in equation (7) can further be altered in order to account for noise of the imaging system. In such a manner, the following objective function is minimized:

$$\alpha\|\Psi_1(I-I_p)\|_1+(1-\alpha)\|\Psi_2 I\|_1+\lambda(X^T DX) \qquad \text{Eqn. (10)};$$

where $X^T$ is the transpose of the difference matrix, X, and D is a system noise matrix, which is a diagonal matrix having the following matrix elements:

$$D_{ij} = \begin{cases} \frac{1}{\sigma_n^2} & \text{if } i = j \\ 0 & \text{if } i \neq j \end{cases} \quad \text{Eqn. (11)}$$

where $\sigma_n^2$ is the noise variance, and is a parameter indicative of noise in the imaging system employed when practicing the present invention. For example, in an x-ray imaging system, the noise parameter, $\sigma_n^2$, is the noise variance associated with the $n^{th}$ x-ray detector.

Figure 1:
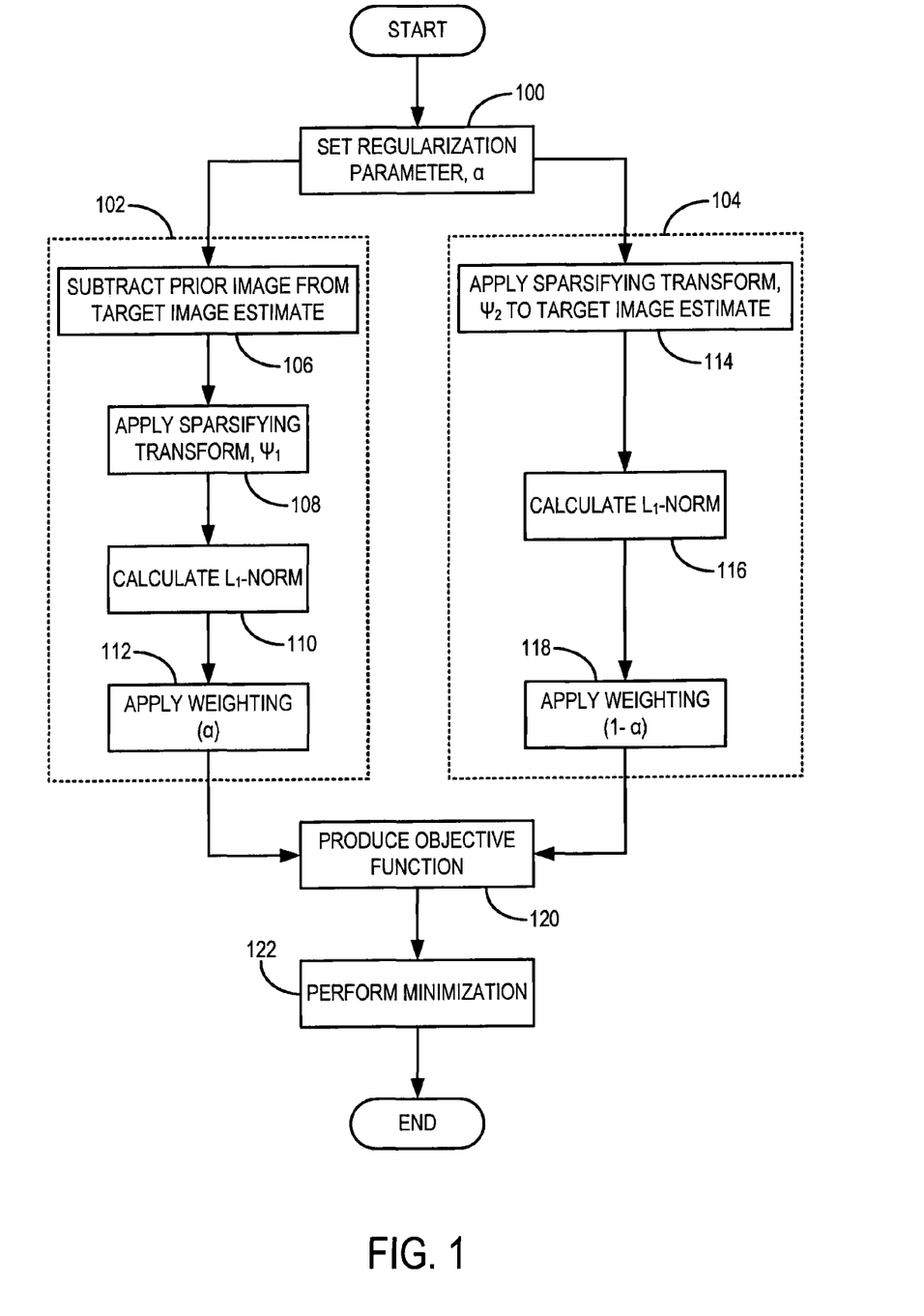
FIG. 1 is a flowchart an embodiment of an image reconstruction method utilized by the present invention.

With reference now to FIG. 1, one implementation of the method of the present invention employs the objective function of equation (2), and begins by initializing the regularization parameter, α, as indicated at step 100. The choice of the regularization parameter, α, determines the trade-off between the sparsity of the desired image, and the influence of the prior image on the desired image. Accordingly, the value of the regularization parameter, α, will vary depending on the clinical application at hand. For example, a value of α≈0.3-0.7 is generally sufficient for respiratory imaging applications. Subsequently, the first and second terms in the objective function of equation (2) are initialized, as indicated in steps 102 and 104, respectively. The initialization of the first term, $\alpha \|\Psi_1(I-I_p)\|_1$, begins at step 106 where the prior image, $I_p$, is subtracted from an estimate of the desired image, I, to produce a "difference image". The particular choice of the prior image, $I_p$, and the estimate of the desired image, I, will depend on the imaging modality and the particular clinical application. Accordingly, different alternatives for these choices will be discussed in detail below. The difference image is subsequently sparsified by applying the sparsifying transform, $\Psi_1$, as indicated at step 108. As described above, the sparsifying transform, $\Psi_1$, can be any number of mathematical operations, including a wavelet transform, a first order finite difference, a second order finite difference, and a discrete gradient transform. The $L_1$-norm of this sparsified difference image is then calculated at step 110. The result of this process is then weighted by the regularization parameter, α, as indicated at step 112.

The initialization of the second term in the objective function of equation (2), $(1-\alpha)\|\Psi_2 I\|_1$, begins at step 114 where the estimate of the desired image, I, is sparsified through the application of the sparsifying transform, $\Psi_2$. Subsequently, the $L_1$-norm of this sparsified desired image estimate is calculated at step 116. When the discrete gradient transform, $\nabla_{m,n}$, is selected as the sparsifying transform, $\Psi_2$, steps 114 and 116 can be viewed as calculating the total variation, TV, of the desired image estimate, which has the form:

$$TV(I) = \|\nabla I\|_1 \Sigma |\nabla I| \quad \text{Eqn. (12)}.$$

After the $L_1$-norm of the sparsified desired image estimate is calculated, the result is weighted by $(1-\alpha)$, as indicated at step 118. The objective function of equation (2) is subsequently produced in step 120 by adding the first and second terms together. This objective function is then minimized, as indicated at step 122, using, for example, a nonlinear conjugate gradient method. The minimization process proceeds until a stopping criterion is satisfied. The stopping criterion includes, for example, comparing the current estimate of the desired image with the estimate of the desired image from the previous iteration. Such a stopping criterion has the following form:

$$\sum_i \sum_j (I_{ij}^{(k+1)} - I_{ij}^{(k)})^2; \quad \text{Eqn. (13)}$$

where, $I_{ij}^{(k+1)}$ is the value of the $(k+1)^{th}$ estimate of the desired image at the pixel location (i,j), and $I_{ij}^{(k)}$ is the value of the $k^{th}$ estimate of the desired image at the pixel location (i,j).

Figure 2:
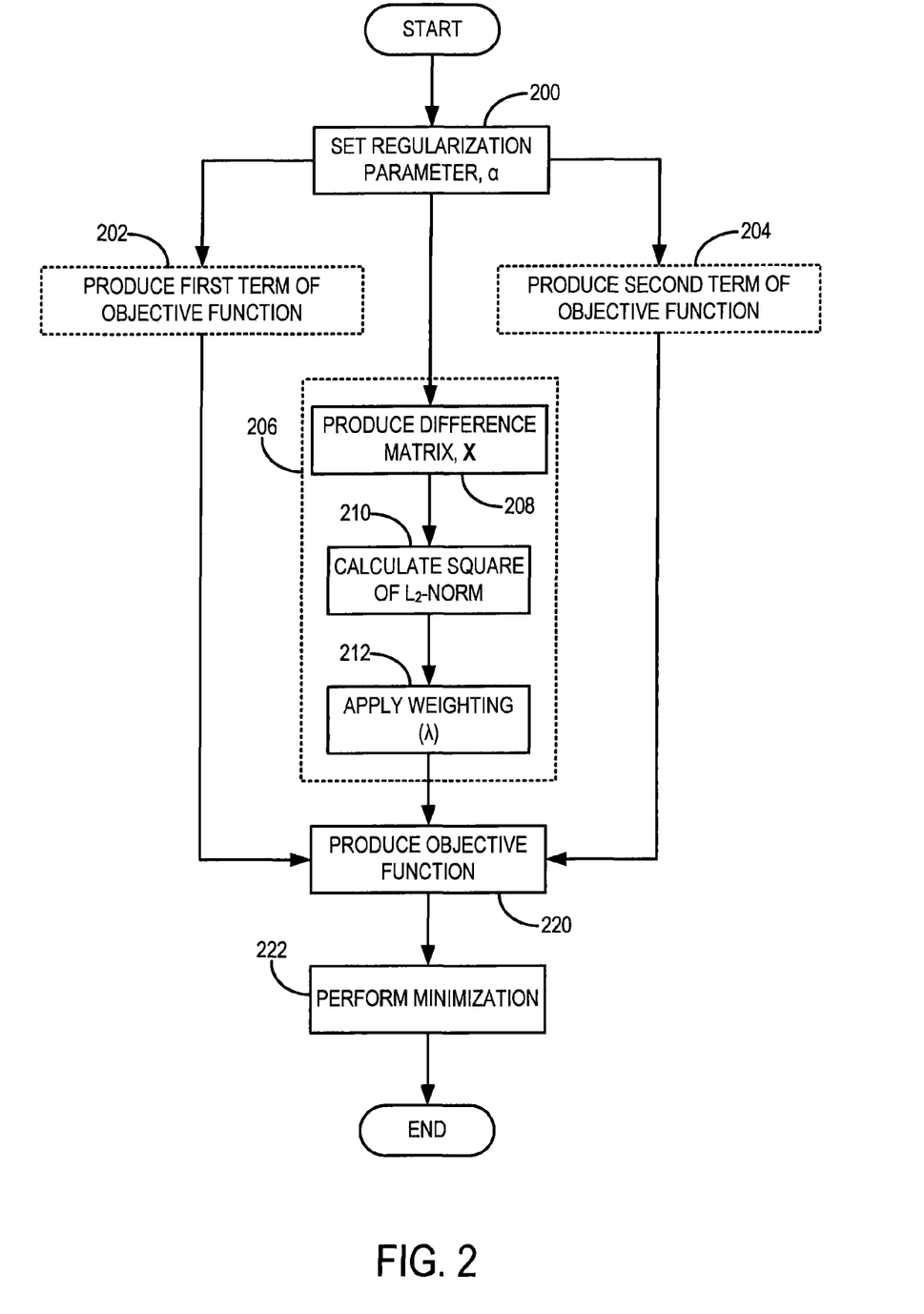
FIG. 2 is a flowchart of another embodiment of an image reconstruction method utilized by the present invention.

With reference now to FIG. 2, another implementation of the method of the present invention employs the objective function of equation (7), and begins by initializing the regularization parameter, α, as indicated at step 200. Subsequently, the first and second terms in the objective function of equation (7) are initialized, as indicated in steps 202 and 204, respectively. This process proceeds in the same manner as described above with reference to steps 102 and 104 in FIG. 1. Now, however, the consistency condition of equation (1) is incorporated into a third term, $\lambda\|X\|_2^2$, which is initialized at step 206. First, the difference matrix, X, is produced, as indicated at step 208. As described above in detail, the difference matrix, X, corresponds to the consistency condition of equation (1) and has the form of equation (9).

Thus, the difference matrix is determined by applying the system matrix, A, to the estimate of the desired image, I, and subsequently subtracting the acquired image data, Y, that corresponds to the desired image. The square of the $L_2$-norm of the difference matrix, X, is calculated next at step 210. After the square of the $L_2$-norm of the difference matrix, X, has been produced, the Lagrange multiplier, λ, is determined and employed to weight the difference matrix, X, as indicated at step 212. As described above, the Lagrange multiplier is empirically determined by and the value selected by the user based on the clinical application at hand. The objective function of equation (7) is subsequently produced in step 220 by adding the first, second, and third terms together. This objective function is then minimized, as indicated at step 222, using, for example, a nonlinear conjugate gradient method. The minimization process proceeds until a stopping criterion is satisfied, as described above.

Figure 3:
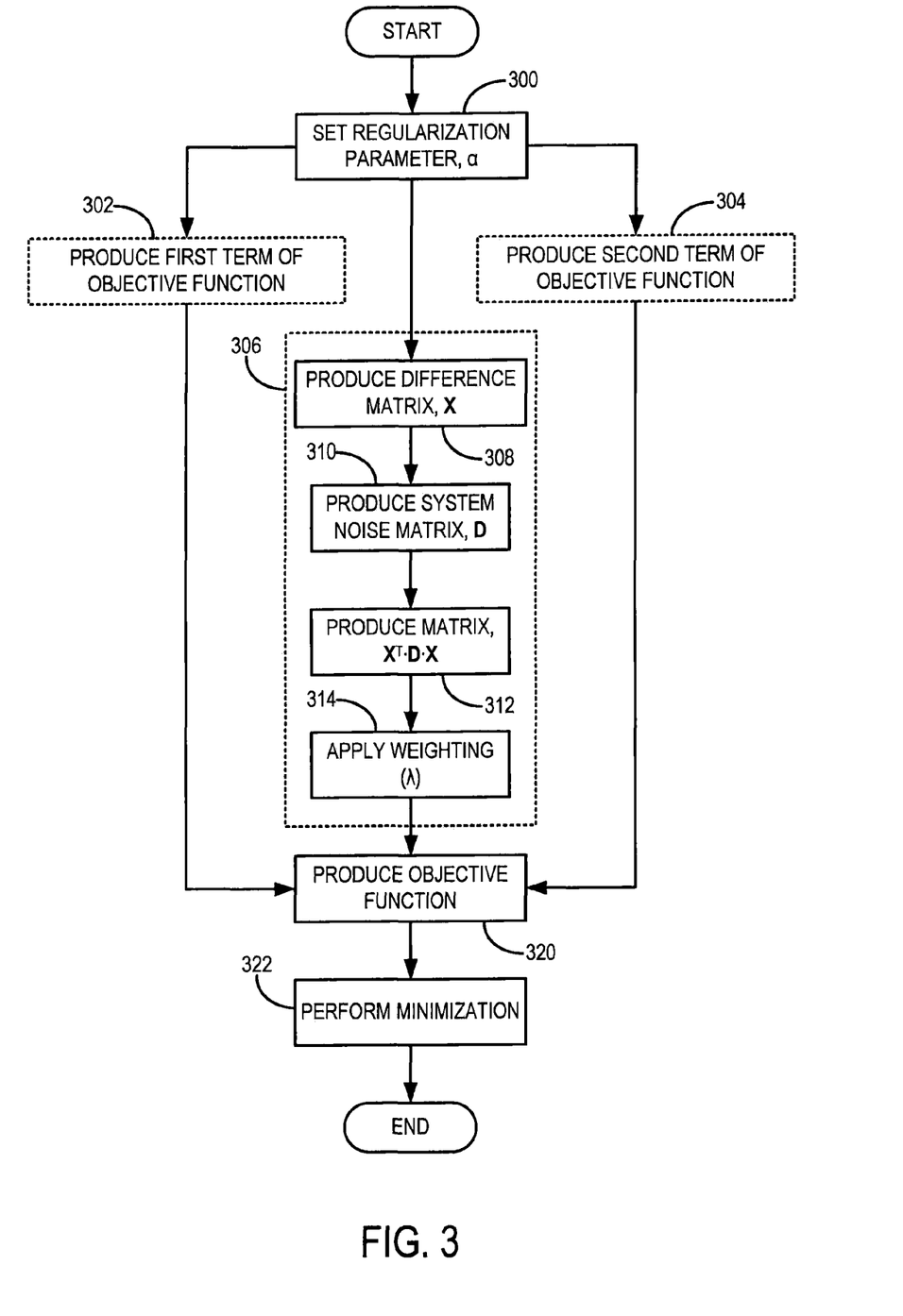
FIG. 3 is a flowchart of yet another embodiment of an image reconstruction method utilized by the present invention.

With reference now to FIG. 3, yet another implementation of the method of the present invention employs the objective function of equation (10), and begins by initializing the regularization parameter, α, as indicated at step 300. Subsequently, the first and second terms in the objective function of equation (10) are initialized, as indicated in steps 302 and 304, respectively. This process proceeds in the same manner as described above with reference to steps 102 and 104 in FIG. 1. Now, however, the consistency condition of equation (1) and the effects of noise in the imaging system are incorporated into a third term, $\lambda(X^T D X)$, which is initialized at step 306. First, the difference matrix, X, is produced, as indicated at step 308, and described above with reference to step 208 in FIG. 2. Next, a system noise matrix, D, is produced, as indicated in step 310. The system noise matrix, D, is a diagonal matrix having matrix elements determined in accordance with the following:

$$D_{ij} = \begin{cases} \frac{1}{\sigma_n^2} & \text{if } i = j \\ 0 & \text{if } i \neq j \end{cases} \quad \text{Eqn. (14)}$$

As described above, $\sigma_n^2$ is the noise variance, and is a parameter indicative of noise in the imaging system employed when practicing the present invention. For example, in an x-ray imaging system, the noise parameter, $\sigma_n^2$, is the noise variance associated with the $n^{th}$ x-ray detector. After the system noise matrix, D, has been produced, the following matrix multiplication is performed:

$$X^T DX, \quad \text{Eqn. (15);}$$

as indicated at step 312. The result of this operation is subsequently scaled by the Lagrange multiplier, as indicated at step 314. The objective function of equation (10) is subsequently produced in step 320 by adding the first, second, and third terms together. This objective function is then minimized, as indicated at step 322, using, for example, a nonlinear conjugate gradient method. The minimization process proceeds until a stopping criterion is satisfied, as described above.

C-Arm X-Ray Imaging System

Figure 4A:
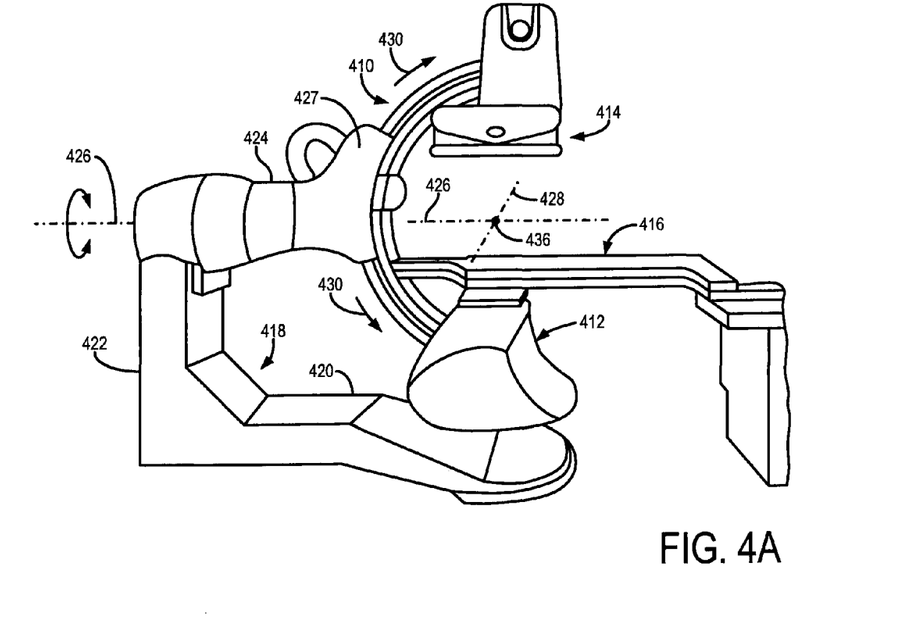
FIG. 4A is a pictorial view of a C-arm x-ray system which employs the present invention.
Figure 4B:
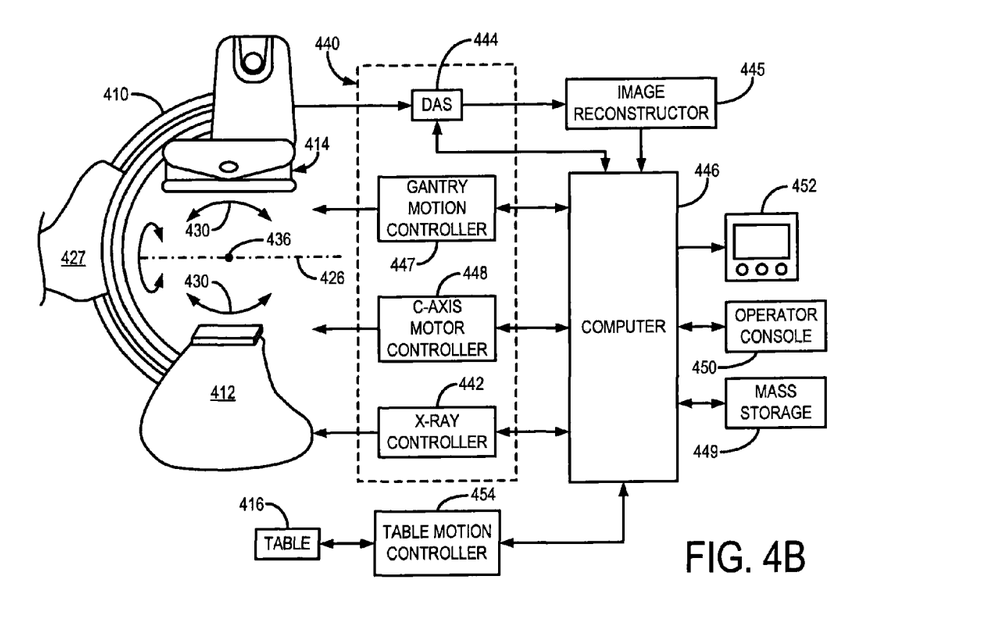
FIG. 4B is a block diagram of the C-arm x-ray system of FIG. 4A.

Referring particularly to FIGS. 4A and 4B, an embodiment of the invention employed to reconstruct images employs an x-ray system that is designed for use in connection with interventional procedures. It is characterized by a gantry having a C-arm 410 which carries an x-ray source assembly 412 on one of its ends and an x-ray detector array assembly 414 at its other end. The gantry enables the x-ray source 412 and detector 414 to be oriented in different positions and angles around a patient disposed on a table 416, while enabling a physician access to the patient.

The gantry includes an L-shaped pedestal 418 which has a horizontal leg 420 that extends beneath the table 416 and a vertical leg 422 that extends upward at the end of the horizontal leg 420 that is spaced from of the table 416. A support arm 424 is rotatably fastened to the upper end of vertical leg 422 for rotation about a horizontal pivot axis 426. The pivot axis 426 is aligned with the centerline of the table 416 and the arm 424 extends radially outward from the pivot axis 426 to support a C-arm drive assembly 427 on its outer end. The C-arm 410 is slidably fastened to the drive assembly 427 and is coupled to a drive motor (not shown) which slides the C-arm 410 to revolve it about a C-axis 428 as indicated by arrows 430. The pivot axis 426 and C-axis 428 intersect each other at an isocenter 436 located above the table 416 and they are perpendicular to each other.

The x-ray source assembly 412 is mounted to one end of the C-arm 410 and the detector array assembly 414 is mounted to its other end. As will be discussed in more detail below, the x-ray source 412 emits a cone beam of x-rays which are directed at the detector array 414. Both assemblies 412 and 414 extend radially inward to the pivot axis 426 such that the center ray of this cone beam passes through the system isocenter 436. The center ray of the cone beam can thus be rotated about the system isocenter around either the pivot axis 426 or the C-axis 428, or both during the acquisition of x-ray attenuation data from a subject placed on the table 416.

Figure 5A:
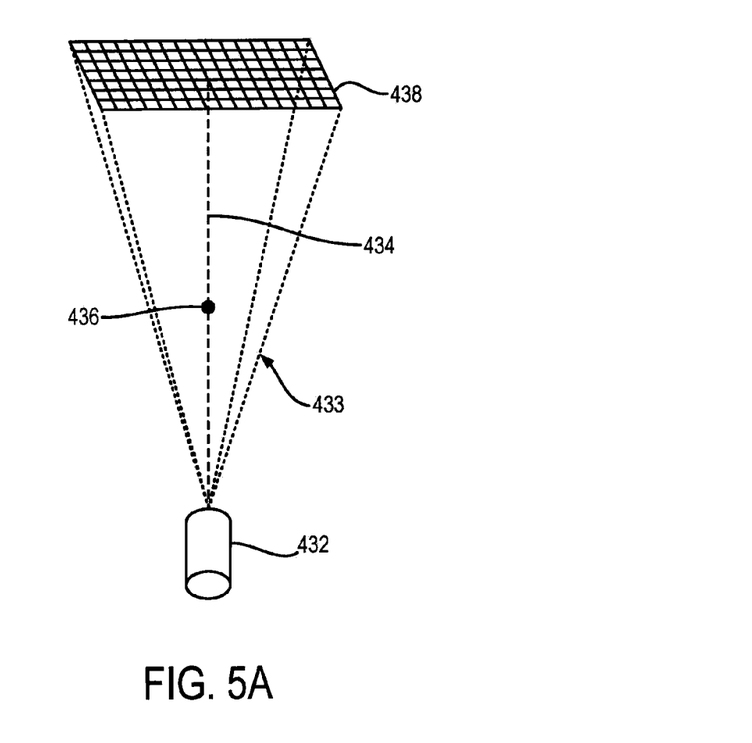
FIG. 5A is a pictorial view of the x-ray source and detector in the C-arm x-ray system of FIG. 4A.

As shown in FIG. 5A, the x-ray source assembly 412 contains an x-ray source 432 which emits a cone beam 433 of x-rays when energized. The center ray 434 passes through the system isocenter 436 and impinges on a two-dimensional flat panel digital detector 438 housed in the detector assembly 414. The detector 438 is a 2048 by 2048 element two-dimensional array of detector elements having a size of 41 cm by 41 cm. Each element produces an electrical signal that represents the intensity of an impinging x-ray and hence the attenuation of the x-ray as it passes through the patient. During a scan the x-ray source 432 and detector array 438 are rotated about the system isocenter 436 to acquire x-ray attenuation projection data from different angles. The detector array is able to acquire 30 projections, or views, per second and this is the limiting factor that determines how many views can be acquired for a prescribed scan path and speed.

Figure 5B:
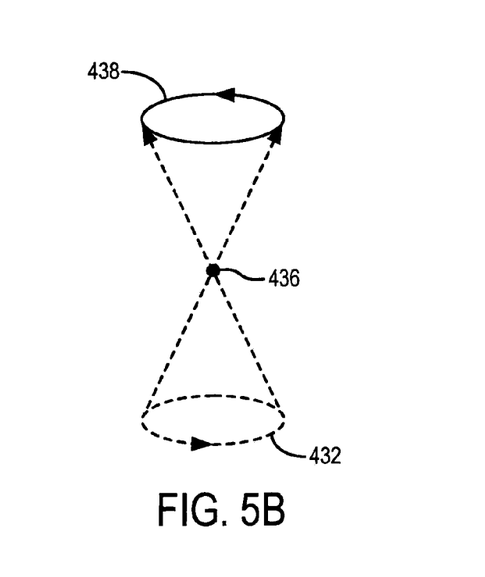
FIG. 5B is a pictorial view of the C-arm scan path employed by the C-arm x-ray system of FIG. 4A.

Referring particularly to FIG. 5B, the rotation of the assemblies 412 and 414 and the operation of the x-ray source 432 are governed by a control mechanism 440 of the CT system. The control mechanism 440 includes an x-ray controller 442 that provides power and timing signals to the x-ray source 432. A data acquisition system (DAS) 444 in the control mechanism 440 samples data from detector elements 438 and passes the data to an image reconstructor 445. The image reconstructor 445, receives digitized x-ray data from the DAS 444 and performs high speed image reconstruction according to the methods of the present invention. The reconstructed image is applied as an input to a computer 446 which stores the image in a mass storage device 449 or processes the image further.

The control mechanism 440 also includes pivot motor controller 447 and a C-axis motor controller 448. In response to motion commands from the computer 446 the motor controllers 447 and 448 provide power to motors in the x-ray system that produce the rotations about respective pivot axis 426 and C-axis 428. A program executed by the computer 446 generates motion commands to the motor drives 447 and 448 to move the assemblies 412 and 414 in a prescribed scan path.

The computer 446 also receives commands and scanning parameters from an operator via console 450 that has a keyboard and other manually operable controls. An associated cathode ray tube display 452 allows the operator to observe the reconstructed image and other data from the computer 446. The operator supplied commands are used by the computer 446 under the direction of stored programs to provide control signals and information to the DAS 444, the x-ray controller 442 and the motor controllers 447 and 448. In addition, computer 446 operates a table motor controller 454 which controls the motorized table 416 to position the patient with respect to the system isocenter 436.

The above described x-ray system may be operated in a fluoroscopic mode to produce two-dimensional images in real-time. Typically, this mode is used when a procedure such as catheterization is performed on the patient and the fluoroscopic images are used to help guide the procedure. It is desired that image frames are produced with an SNR sufficient to see the instrument being guided and the surrounding anatomy. Furthermore, it is desirable that the image frames be produced with a frame rate sufficient to provide near real-time images of the procedure, and with an x-ray dose as low as possible.

Magnetic Resonance Imaging System

Figure 6:
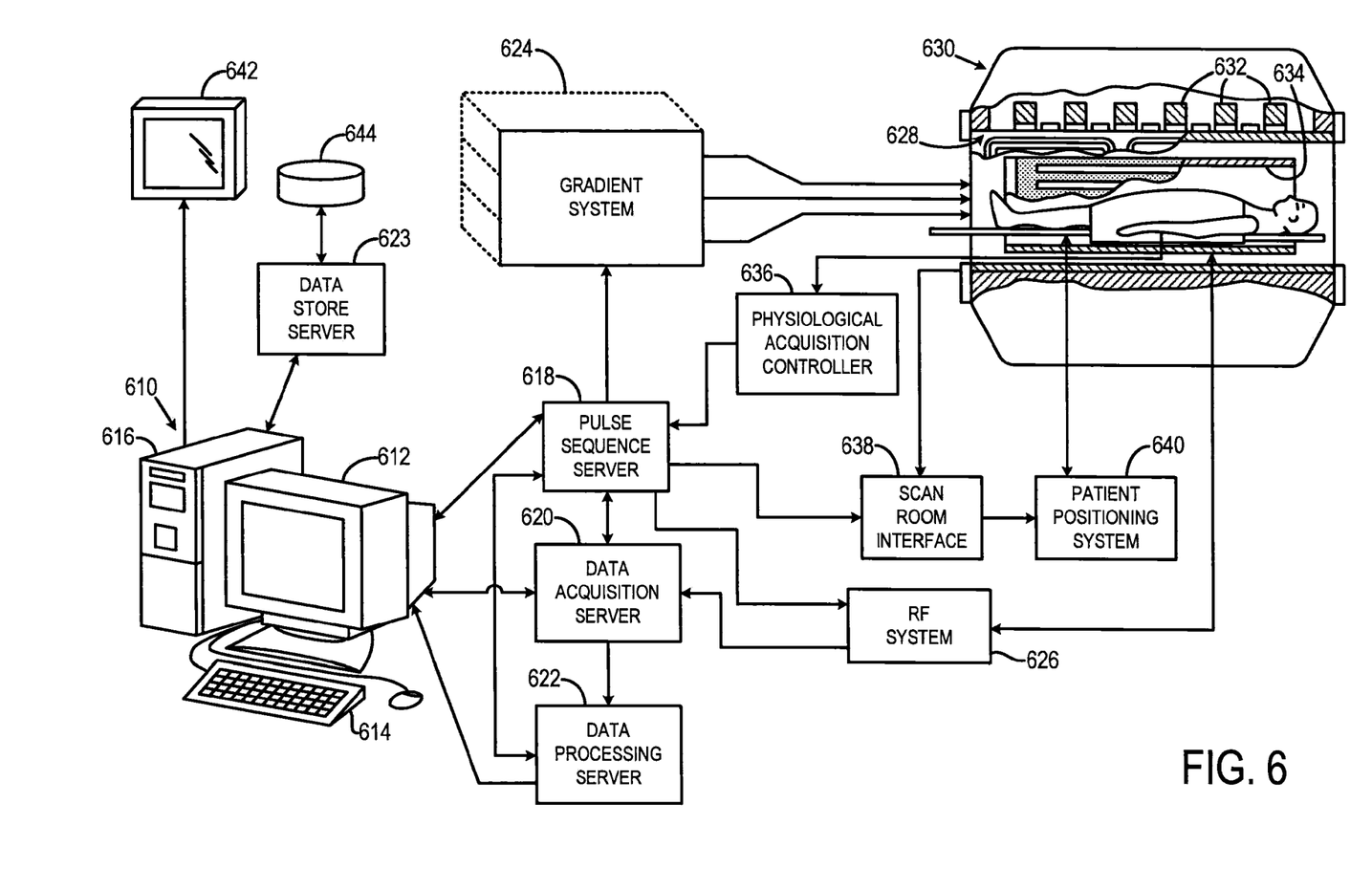
FIG. 6 is a block diagram of a magnetic resonance imaging (MRI) system which employs the present invention.

Referring particularly to FIG. 6, the preferred embodiment of the invention is employed in an MRI system. The MRI system includes a workstation 610 having a display 612 and a keyboard 614. The workstation 610 includes a processor 616 that is a commercially available programmable machine running a commercially available operating system. The workstation 610 provides the operator interface that enables scan prescriptions to be entered into the MRI system. The workstation 610 is coupled to four servers: a pulse sequence server 618; a data acquisition server 620; a data processing server 622, and a data store server 623. The workstation 610 and each server 618, 620, 622 and 623 are connected to communicate with each other.

The pulse sequence server 618 functions in response to instructions downloaded from the workstation 610 to operate a gradient system 624 and an RF system 626. Gradient waveforms necessary to perform the prescribed scan are produced and applied to the gradient system 624 that excites gradient coils in an assembly 628 to produce the magnetic field gradients $G_x$, $G_y$, and $G_z$ used for position encoding MR signals. The gradient coil assembly 628 forms part of a magnet assembly 630 that includes a polarizing magnet 632 and a whole-body RF coil 634.

RF excitation waveforms are applied to the RF coil 634 by the RF system 626 to perform the prescribed magnetic resonance pulse sequence. Responsive MR signals detected by the RF coil 634 or a separate local coil (not shown in FIG. 6) are received by the RF system 626, amplified, demodulated, filtered and digitized under direction of commands produced by the pulse sequence server 618. The RF system 626 includes an RF transmitter for producing a wide variety of RF pulses used in MR pulse sequences. The RF transmitter is responsive to the scan prescription and direction from the pulse sequence server 618 to produce RF pulses of the desired frequency, phase and pulse amplitude waveform. The generated RF pulses may be applied to the whole body RF coil 634 or to one or more local coils or coil arrays (not shown in FIG. 6).

The RF system 626 also includes one or more RF receiver channels. Each RF receiver channel includes an RF amplifier that amplifies the MR signal received by the coil to which it is connected and a detector that detects and digitizes the I and Q quadrature components of the received MR signal. The magnitude of the received MR signal may thus be determined at any sampled point by the square root of the sum of the squares of the I and Q components:

$$M = \sqrt{I^2 + Q^2},$$

and the phase of the received MR signal may also be determined:

$$\phi = \tan^{-1}\left(\frac{Q}{I}\right).$$

The pulse sequence server 618 also optionally receives patient data from a physiological acquisition controller 636. The controller 636 receives signals from a number of different sensors connected to the patient, such as ECG signals from electrodes or respiratory signals from a bellows. Such signals are typically used by the pulse sequence server 618 to synchronize, or "gate", the performance of the scan with the subject's respiration or heart beat.

The pulse sequence server 618 also connects to a scan room interface circuit 638 that receives signals from various sensors associated with the condition of the patient and the magnet system. It is also through the scan room interface circuit 638 that a patient positioning system 640 receives commands to move the patient to desired positions during the scan.

The digitized MR signal samples produced by the RF system 626 are received by the data acquisition server 620. The data acquisition server 620 operates in response to instructions downloaded from the workstation 610 to receive the real-time MR data and provide buffer storage such that no data is lost by data overrun. In some scans the data acquisition server 620 does little more than pass the acquired MR data to the data processor server 622. However, in scans that require information derived from acquired MR data to control the further performance of the scan, the data acquisition server 620 is programmed to produce such information and convey it to the pulse sequence server 618. For example, during prescans MR data is acquired and used to calibrate the pulse sequence performed by the pulse sequence server 618. Also, navigator signals may be acquired during a scan and used to adjust RF or gradient system operating parameters or to control the view order in which k-space is sampled. And, the data acquisition server 620 may be employed to process MR signals used to detect the arrival of contrast agent in a magnetic resonance angiography (MRA) scan. In all these examples the data acquisition server 620 acquires MR data and processes it in real-time to produce information that is used to control the scan.

The data processing server 622 receives MR data from the data acquisition server 620 and processes it in accordance with instructions downloaded from the workstation 610. Such processing may include, for example: Fourier transformation of raw k-space MR data to produce two or three-dimensional images; the application of filters to a reconstructed image; the performance of a backprojection image reconstruction of acquired MR data; the calculation of functional MR images; the calculation of motion or flow images, etc.

Images reconstructed by the data processing server 622 are conveyed back to the workstation 610 where they are stored. Real-time images are stored in a data base memory cache (not shown) from which they may be output to operator display 612 or a display 642 that is located near the magnet assembly 630 for use by attending physicians. Batch mode images or selected real time images are stored in a host database on disc storage 644. When such images have been reconstructed and transferred to storage, the data processing server 622 notifies the data store server 623 on the workstation 610. The workstation 610 may be used by an operator to archive the images, produce films, or send the images via a network to other facilities.

Figure 7:
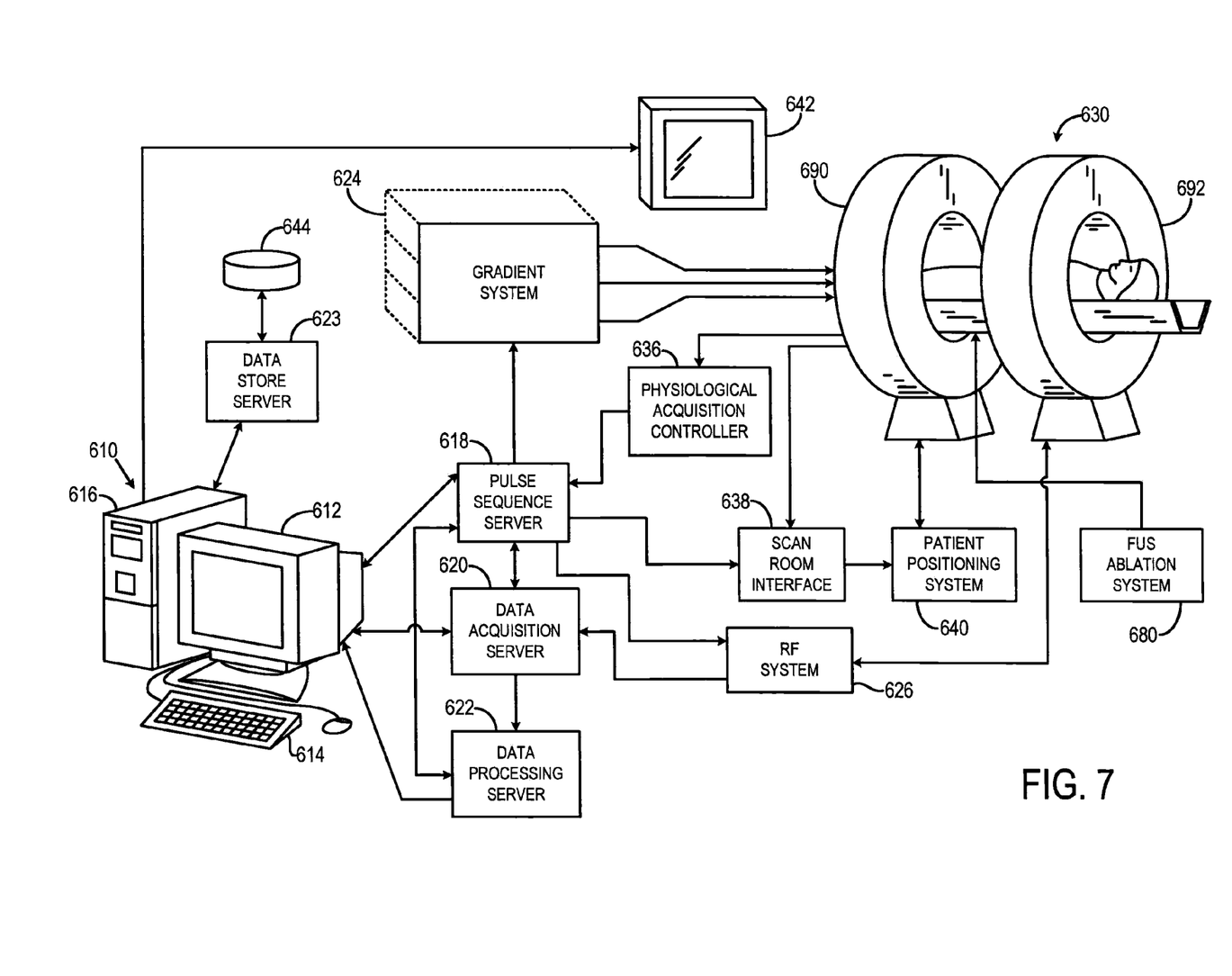
FIG. 7 is a block diagram of another magnetic resonance imaging (MRI) system which employs the present invention.

While a conventional MRI system may be used to implement the invention, in one embodiment an MRI system, which is designed to allow access by a physician, is employed. Referring particularly to FIG. 7, when an intraoperative MR imaging procedure is conducted a patient is placed in the magnet system 630 and a region of interest in the patient is aligned near the system isocenter located between the two, spaced magnet rings 690 and 692. A physician standing between magnet rings 690 and 692 has unrestricted access to the region of interest in the patient. During the procedure the patient may move, or be moved by the physician. An ultrasonic transducer (not shown) connected to a focused ultrasound (FUS) ablation system 680 may be manipulated by the physician to treat a selected region of the patient and the images produced on display 642 may be used by the physician to help aim the ablation device and to determine when treatment is completed.

Image Reconstruction

Figure 8:
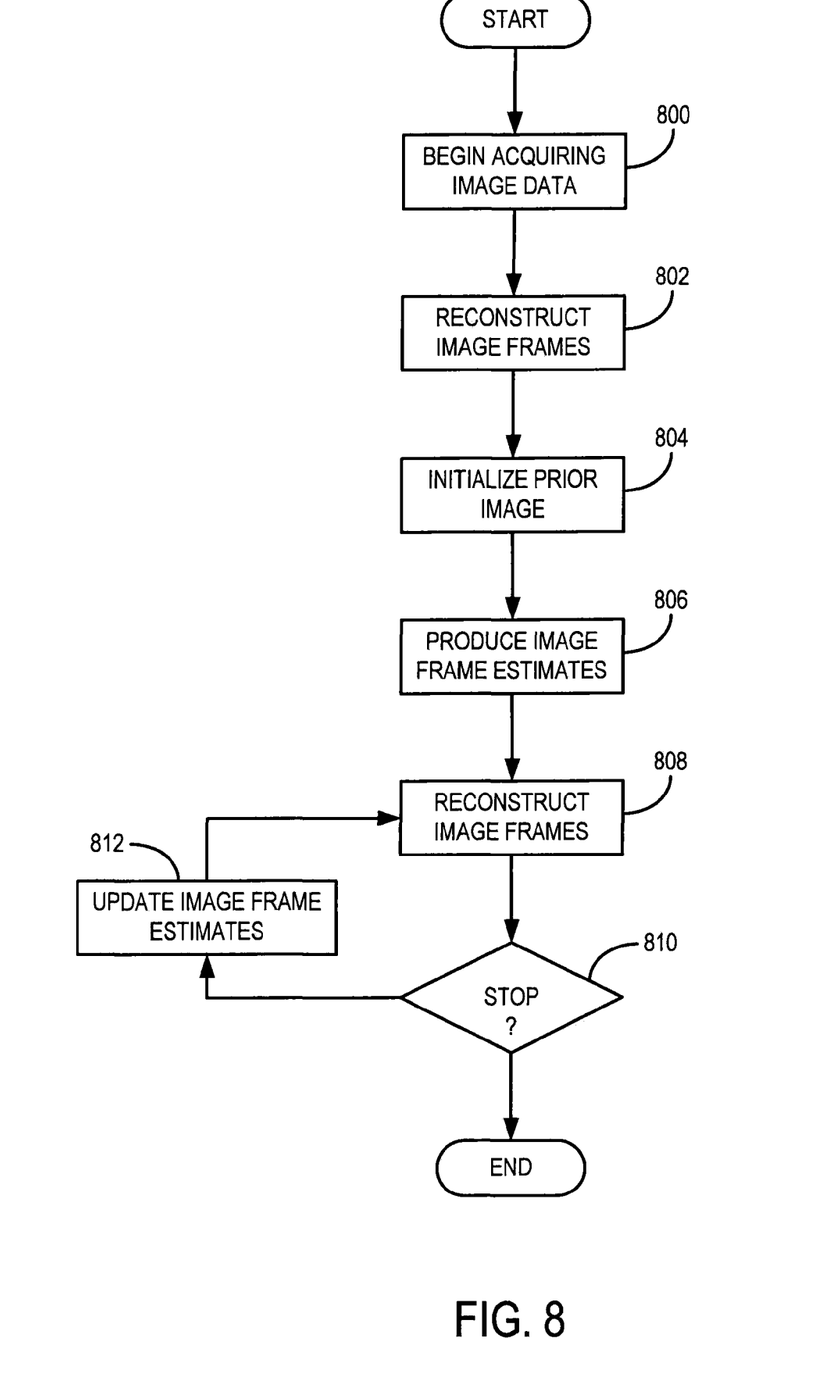
FIG. 8 is a flowchart setting forth the steps of an embodiment of the present invention.

Referring now particularly to FIG. 8, an embodiment of the present invention begins by acquiring image data with the imaging system, as indicated at step 800. When practiced with the C-arm x-ray imaging system, such as the one shown above in FIGS. 4A and 4B, image data is acquired as a series of x-ray projections that undersample x-ray projection space. In the alternative, when practiced with an MRI system, such as the one shown above in FIG. 6 or the one shown above in FIG. 7, image data is acquired as a series of k-space projections that undersample k-space. In one embodiment, the image data acquired is time-resolved image data, in that it corresponds to a time series of image frames. More specifically, an "image frame" can be reconstructed from the image data acquired at a corresponding time point, or "time frame".

From the acquired image data, an initial image frame is next reconstructed for each corresponding time frame, as indicated at step 802. This is a standard image reconstruction. For example, when the image data is x-ray image data, a filtered backprojection image reconstruction method is employed. Additionally, for example, when the image data is a series of k-space projections, a backprojection method may also be employed. In the alternative, k-space projection data can be regridded onto a Cartesian grid and conventional Fourier transform reconstruction methods employed. Since the image data acquired during each time frame is undersampled, image artifacts such as streaking an aliasing will be present in the initial image frames reconstructed above. These initial image frames are employed instead to produce a prior image of the subject, as indicated at step 804. For example, the prior image is produced by averaging the available initial image frames.

The resultant prior image, the acquired image data, and the currently available initial image frames are subsequently employed to produce estimates of the corresponding image frames, as indicated at step 806. The image frame estimates are produced, for example, using an algebraic reconstruction technique (ART). These image frames estimates are utilized, along with the prior image, to reconstruct final image frames of the subject in accordance with the minimization methods set forth below, as indicated at step 808. In particular, the following objective function is iteratively minimized:

$$\|\Psi_1(\bar{I} - I_P)\|_1 + \alpha\|\Psi_2 I_t\|_1 + \beta\sum_{t=2}^{N} \|\Psi_3(I_t - I_{t-1})\|_1;$$

where $\Psi_1$, $\Psi_2$, and $\Psi_3$ are sparsifying transforms; $\bar{I}$ is the average of the currently available image frame estimates, $I_t$; $I_p$ is the prior image; $\alpha$ and $\beta$ are regularization parameters, and $I_t$ is the $t^{th}$ image frame. The above-listed objective function differs from those in equations (2), (7), and (10) in at least two ways. First, the last term in the objective function:

$$\beta\sum_{t=2}^{N} \|\Psi_3(I_t - I_{t-1})\|_1;$$

is a sum of the difference between two adjacent image frame estimates over all of the available image frame estimates. In this manner, the nearest neighbor image frame, $I_{t-1}$, to a current image frame, $I_t$, acts similar to the prior image in equations (2), (7), and (10), in that it is employed to constrain the reconstruction of the current image frame from undersampled data. Second, the first term in the objective function:

$$\|\Psi_1(\bar{I}-I_P)\|_1;$$

calculates the difference between the prior image and the average of the available image frame estimates. For these two reasons, the embodiment of the present invention that employs the foregoing objective function is well suited to real-time imaging applications, in which data is continuously acquired and images reconstructed while further data is acquired. Such a method allows for an increase in the quality of images acquired during, for example, interventional procedures guided by x-ray or MR imaging systems.

When the appropriate stopping criterion is reached, as indicated at decision block 810, the image reconstruction method is halted and the desired image frames are either stored or displayed to a monitor. If the stopping criterion is not satisfied, the image frame estimates are updated with the output of the minimization of the objective function, as indicated at step 812. Subsequently, these updated image frame estimates are utilized in the above-listed objective function. Exemplary stopping criteria include the difference between two adjacent iterations being less than a preset threshold value.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for reconstructing a time series of image frames of a subject with an imaging system, the steps comprising:
   a) acquiring, with the imaging system, image data from the subject;
   b) producing a prior image using the acquired image data;
   c) producing a plurality of image frame estimates using the acquired image data and the prior image;
   d) reconstructing a plurality of image frames using the prior image and the plurality of image frame estimates; and
   e) iteratively repeating step d) until a stopping criterion is satisfied, wherein the plurality of image frame estimates are updated after each iteration.

2. The method as recited in claim 1 in which step d) includes calculating the difference between the image frame estimate from a current time frame and the image frame estimate from a previous time frame.

3. The method as recited in claim 1 in which step b) includes reconstructing a plurality of initial image frames and producing the prior image by averaging the plurality of initial image frames.

4. The method as recited in claim 1 in which the imaging system is at least one of an x-ray fluoroscopy imaging system, a C-arm x-ray imaging system, a magnetic resonance imaging (MRI) system, and an interventional MRI system.

5. The method as recited in claim 1 in which step c) includes performing an algebraic reconstruction technique (ART).

6. The method as recited in claim 1 in which step d) includes minimizing an objective function of the form:

$$\|\Psi_1(\bar{I} - I_P)\|_1 + \alpha\|\Psi_2 I_t\|_1 + \beta\sum_{t=2}^{N} \|\Psi_3(I_t - I_{t-1})\|_1$$

wherein:
   $\Psi_1$=a first sparsifying transform;
   $\Psi_2$=a second sparsifying transform;
   $\Psi_3$=a third sparsifying transform;
   $\bar{I}$=an average of the plurality of image frame estimates;
   $I_p$=the prior image;
   $\alpha$=a first regularization parameter;
   $I_t$=an image frame estimate for a current time frame;
   $\beta$=a second regularization parameter; and
   $I_{t-1}$=an image frame estimate for a previous time frame.

7. A method for reconstructing an image of a subject with an imaging system, the steps comprising:
   a) acquiring, with the imaging system, image data from the subject;

b) producing a prior image of the subject using the acquired image data;
c) producing, using the acquired image data and the prior image, a current image frame estimate corresponding to a current time frame;
d) selecting a new time frame and storing the current image frame estimate as a previous image frame estimate;
e) repeating step c) to produce the current image frame estimate corresponding to the new time frame; and
f) reconstructing an image frame corresponding to the new time frame using the previous image frame estimate, the new current image frame estimate, and the prior image.

8. The method as recited in claim 7 in which steps d)-f) are repeated to produce a plurality of image frames corresponding to a plurality of time frames.

9. The method as recited in claim 7 in which step b) includes reconstructing a plurality of initial image frames and producing the prior image by averaging the plurality of initial image frames.

10. The method as recited in claim 7 in which step c) includes performing an algebraic reconstruction technique (ART).

11. The method as recited in claim 7 in which the imaging system is at least one of an x-ray fluoroscopy imaging system, a C-arm x-ray imaging system, a magnetic resonance imaging (MRI) system, and an interventional MRI system.

* * * * *